United States Patent [19]

Kuhlmann et al.

[11] 4,414,745
[45] Nov. 15, 1983

[54] GUIDING ARRANGEMENT FOR A HAND TOOL

[75] Inventors: Gerhard Kuhlmann, Stuttgart; Erwin Wolf, Weissach, both of Fed. Rep. of Germany

[73] Assignee: Robert Bosch GmbH, Stuttgart, Fed. Rep. of Germany

[21] Appl. No.: 298,164

[22] Filed: Aug. 31, 1981

[30] Foreign Application Priority Data

Sep. 16, 1980 [DE] Fed. Rep. of Germany ....... 8024714

[51] Int. Cl.³ .............................................. B23D 51/04
[52] U.S. Cl. ....................................... 30/373; 30/310; 33/27 L; 33/42
[58] Field of Search ................. 30/371, 373, 372, 310, 30/392, 391, 273; 33/185 R, 186, 27 L, 42

[56] References Cited

U.S. PATENT DOCUMENTS 2,819,742  1/1958  Blachly ................................. 30/373
4,262,421  4/1981  Bergler et al. ......................... 30/393

FOREIGN PATENT DOCUMENTS 5372 of 1909 United Kingdom ................ 33/27 L

Primary Examiner—E. R. Kazenske
Assistant Examiner—Douglas D. Watts
Attorney, Agent, or Firm—Michael J. Striker

[57] ABSTRACT

A guiding arrangement for a hand saw includes a support located below the saw housing, a guiding strip adjustably connected to the support and a guiding rail secured to the guiding strip. The guiding rail extends normal to the guiding strip and serves as a guide for a saw when the blade of the latter makes straight parallel cuts. The guiding rail has at least one projection formed with two openings for selectively receiving a centering pin utilized in operation when the saw blade makes circular cuts.

6 Claims, 3 Drawing Figures

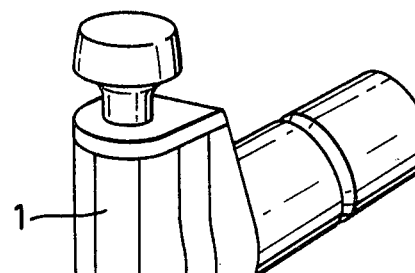
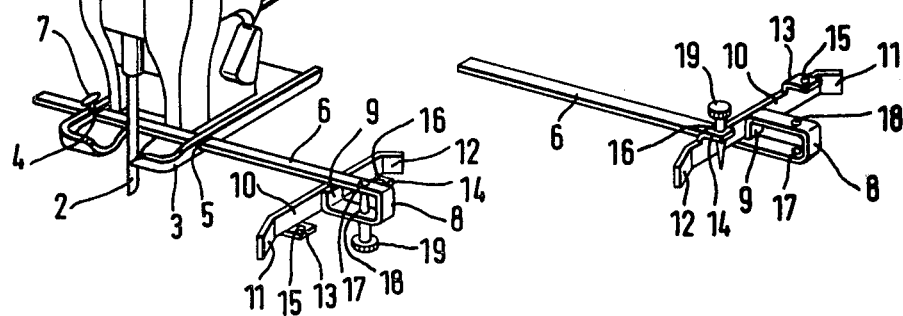
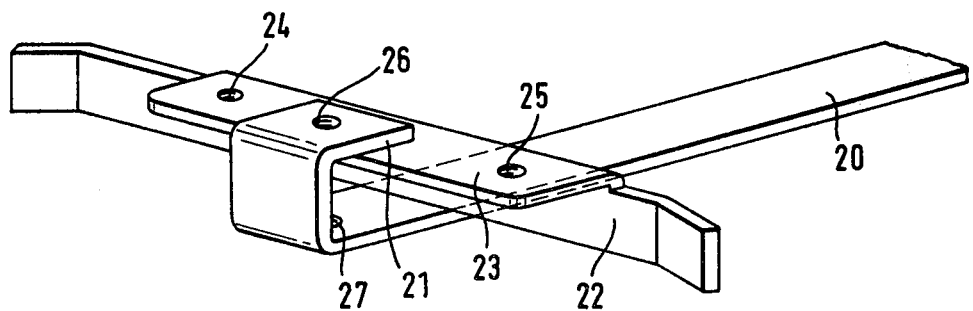

4,414,745

GUIDING ARRANGEMENT FOR A HAND TOOL

BACKGROUND OF THE INVENTION

The present invention relates to hand tools, such as hand saws. More particularly, the invention pertains to guiding arrangements which bear on a workpiece and guide a tool in operation.

In practice there are known guiding arrangements employable with hand saws adapted for making straight parallel cuts in a workpiece. Also known are guiding arrangements for saws producing circular cuts. The latter are disclosed, for example in a German patent publication DE-GM No. 1460 226. It has been also suggested in the art to combine the guiding arrangements for parallel cuts and the devices employed for circular cuts. The problem encountered in such arrangements was that it was impossible to observe a selected center point for a circular cut performed by a saw during operation. Centering pins utilized in guide arrangements for circular cuts are rather short and an operator has difficulties in pushing them onto a surface of the workpiece. Furthermore, structural elements carrying centering pins in conventional devices are individual elements which can be easily lost and, therefore to prevent this they are usually placed on the surface of the workpiece, which has been found rather inconvenient.

SUMMARY OF THE INVENTION

It is an object of the invention to avoid the disadvantages of the previously known guiding arrangements.

Another object of the invention is to provide an improved guiding arrangement for a hand saw.

Still another object of the invention is to provide an arrangement which provides an operator with a very satisfactory view of observation of a center point of a circular arc during making of a circular cut in a workpiece.

These and other objects of the invention are attained by a guide arrangement for a hand tool, particularly for a compass saw, comprising a tool support, a guide element connectable to said support; a guide rail secured to said element and adapted to abut an edge of a workpiece when a straight parallel cut is produced, said guide element having a strip-like shape, said guide rail including at least one projection extending parallel to said guide element and provided with at least two openings; and a centering pin receivable in one of said openings selectively, said centering pin having such a length that when it is inserted into one of said opening it projects through said guide element towards the surface of the workpiece to enable the tool to produce a circular cut.

The centering pin is very reliably held in the openings and inserted in those openings without requiring of an augen.

The guide rail may extend normal to the elongation of the guide element.

The guide rail is rigidly connected to the guide element. Due to such connection the strip-like guide element makes it possible the reliable operation of the saw in producing parallel cuts, and centering the saw and application of acting pressure to the centering pin in making of circular cuts.

The two openings may be equally spaced from the strip-like guide member by a distance which corresponds to a distance between the tips of the teeth of the saw blade and the strip-like guide member.

The strip-like guide member may have a loop-like end portion connected to said guide rail.

Alternatively, the strip-like guide member may have a U-shaped end portion connected to said guide rail.

The end portion may have two vertically spaced surfaces formed with two aligned openings adapted to receive the centering pin when a straight parallel cut is produced.

The guide rail may have two projections extending parallel to the guide element, said openings being formed in said two projections, respectively.

The strip-like element may be welded or soldered or glued to the guide rail.

It has been found particularly advantageous that the centering pin may be inserted into the openings provided in the loop-shaped or U-formed end portion of the guide member during making of straight parallel cuts. The centering pin in such case is reliably hold in the guiding arrangement and can not be lost. The tip of the pin is located within the loop-shaped end portion of the guide and therefore is protected from being damaged.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a perspective view of a hand saw in accordance with the invention, in a position for performing a parallel straight cut;

FIG. 2 is a perspective view of a saw guide arrangement in a position for performing a circular cut; and FIG. 3 is a perspective view of a modified saw guide arrangement according to the invention.

DETAILED DESCRIPTION OF THE PREFERRED EMBODIMENT

Referring to the drawings, a compass saw 1 includes a saw blade 2. Below the housing of the saw a support 3 is located which is during a sawing process positioned above a workpiece. A guide member 6 of a strip-like shape is inserted through openings 4, 5 made in the support 3. The guide member 6 is then clamped in any desired position in the support 3 by means of a clamping bolt 7. The guide member 6 is formed at its end distant from saw 1 with a loop-shaped projection 8. In a plane parallel to the blade 2 a guide rail 10 extends which is rigidly connected to a lug 9 of projection 8 of the strip-like member 6 by welding, or soldering, or glueing or any other suitable means. This guide rail 10 includes two bent end portions 11 and 12. Additionally, two bent lugs 13 and 14 extending in a plane normal to the elongation of guide rail 10 are provided on the latter. It is to be realized that lugs 13 and 14 are substantially equally spaced from the strip-shaped member 6 and extend in the plane parallel to it. Both lugs 13 and 14 are formed with threaded openings 15 and 16. The distance of each center axis of openings 15 or 16 from a respective edge of the guide member 6 corresponds to the distance between the edge of the guide member and the plane extending through the tips of the teeth of the saw blade 2. The openings 15 and 16 have identical diameters and are in alignment with each other. The projection 8 is further provided with two aligned threaded openings 17 and 18 formed in two opposite surfaces forming this projection.

In the position illustrated in FIG. 1 the guide member 6 is so inserted into openings 4 and 5 that the guide rail 10 lies below the member 6. A centering pin 19 is threaded into the opening 17 so that it is located within the projection 8.

The saw depicted in FIG. 1 serves for producing cuts which are parallel to the edge of the workpiece, this edge abutting against the rear side of the guide rail 10 during operation. The distance between the cut to be made and the edge of the workpiece is adjustable due to adjusting of guide member 6 in the openings 4 and 5 since the guide member 6 can slide in support 3 in the direction of elongation of member 6. When the guide member 6 is adjusted in a certain position it is held in that position by the clamping bolt 7.

In the position illustrated in FIG. 2 the strip-like member 6 is turned 180° about its longitudinal axis. The centering pin 19 is now removed from the opening 17 and inserted into the opening 16.

If the strip-like member 6 in such position is inserted into openings 4 and 5 of the saw 1 and the saw itself will remain in the position as illustrated in FIG. 1 the guide rail 10 will be positioned above the strip-like member 6. The centering pin 19 in this case will be inserted into opening 16 from above and project downwardly below the under surface of the support 3.

The tip of the centering pin 19 can then be applied to the surface of the workpiece at any desired position thereof and pushed so that the saw will produce a circular cut about the axis formed by the centering pin. An operator can easily observe the tip of pin 19 during operation and the guidance of the saw blade 2 at the selected distance from this tip for producing a circular cut will be warranted. When the saw guide means are in the position shown in FIG. 2 and the strip-like member 6 inserted into openings 4, 5 of support 3 is turned from the left, a circular cut in a leftward direction will be produced.

If a circular cut in a rightward direction is to be made the centering pin 19 is inserted into opening 15 and the guide member 6 is guided in a direction from the right towards the left. It is to be understood that due to the structure of the saw guide means of the proposed saw the transential pivotal movement of the saw blade 2 is warranted.

Referring now to FIG. 3, a modified saw guide means is shown in which a strip-like guide element 20 has a cross-section corresponding to that of the member 6. One end of the element 20 has a bent U-formed configuration and includes a shorter leg 21 abutting against a guide rail 22. The connection between U-shaped leg 21 and rail 22 is provided through an extension 23 which is a bent portion of the rail 22. The extension 23 has two openings 24, 25 which correspond to the openings 15 and 16. The U-shaped end projection 21 of the strip-like element 20 is formed with the aligned openings 27 and 26. The element 20 is connected to the rail 22 in the manner similar to that of member 6 and rail 10.

It will be understood that each of the elements described above, or two or more together, may also find a useful application in other types of guiding arrangements differing from the types described above.

While the invention has been illustrated and described as embodied in a guiding arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A guide arrangement for a hand saw with a blade having teeth with tips, comprising a tool support; a guide element connectable to said support; a guide rail secured to said element and adapted to abut an edge of a workpiece when a straight parallel cut is produced; said guide element having a strip-like shape and formed with a loop-like end portion rigidly connected to said guide rail, said guide rail extending normal to the elongation of said guide element and including two projections extending parallel to said guide element and provided with two openings, respectively; and a centering pin threadedly releasably insertable in one of said openings selectively, said centering pin having such a length that when it is inserted into one of said openings it projects past said guide element towards the surface of the workpiece to enable the tool to produce a circular cut, said two openings being equally spaced from said strip-like guide element by a distance which corresponds to the distance between the tips of the teeth of the saw blade and said strip-like guide element along a line parallel to the guide rail.

2. The arrangement of claim 1, wherein said end portion has two vertically spaced surfaces formed with two aligned openings adapted to receive said centering pin when a straight parallel cut is produced.

3. The arrangement of claim 2, wherein a distance between said surfaces is so dimensioned that said centering pin is inserted from outside into one of said aligned openings and projects into another one.

4. The arrangement of claim 3, wherein said strip-like element is welded to said guide rail.

5. The arrangement of claim 3, wherein said strip-like element is soldered to said guide rail.

6. The arrangement of claim 3, wherein said strip-like element is glued to said guide rail.

* * * * *